(12) United States Patent
Misaki et al.

(10) Patent No.: US 10,126,714 B2
(45) Date of Patent: Nov. 13, 2018

(54) TIME DISPLAY DEVICE, TIME DISPLAY METHOD, AND RECORDING MEDIUM

(71) Applicant: CASIO COMPUTER CO., LTD., Tokyo (JP)

(72) Inventors: Naoaki Misaki, Tokyo (JP); Norihito Hanafusa, Kanagawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 232 days.

(21) Appl. No.: 15/271,907

(22) Filed: Sep. 21, 2016

(65) Prior Publication Data
US 2017/0176952 A1    Jun. 22, 2017

(30) Foreign Application Priority Data

Dec. 18, 2015  (JP) ................................ 2015-247255

(51) Int. Cl.
*G04G 9/00*  (2006.01)
*G01C 21/20*  (2006.01)
*G04G 21/08*  (2010.01)

(52) U.S. Cl.
CPC .......... *G04G 9/0076* (2013.01); *G01C 21/20* (2013.01); *G04G 21/08* (2013.01)

(58) Field of Classification Search
CPC ........ G04B 19/22; G04B 19/23; G04G 21/08; G04G 9/0076; G01C 21/20
See application file for complete search history.

(56) References Cited

U.S. PATENT DOCUMENTS

| | | | | | |
|---|---|---|---|---|---|
| 3,232,038 | A | * | 2/1966 | Smith | G04B 19/23 368/191 |
| 4,681,460 | A | * | 7/1987 | Nishimura | G04G 9/0076 368/21 |
| 5,237,544 | A | * | 8/1993 | Sase | G04G 9/0076 368/21 |
| 5,319,581 | A | * | 6/1994 | Sakata | G06F 1/14 708/111 |
| 5,724,316 | A | * | 3/1998 | Brunts | G01C 21/3697 340/988 |

(Continued)

FOREIGN PATENT DOCUMENTS

JP    H01-023695 U    2/1989
JP    2003-121568 A    4/2003

(Continued)

OTHER PUBLICATIONS

Japanese Office Action dated Dec. 5, 2017, in a counterpart Japanese patent application No. 2015-247255. (A machine translation (not reviewed for accuracy) attached.).

*Primary Examiner* — Sean Kayes
(74) *Attorney, Agent, or Firm* — Chen Yoshimura LLP

(57) ABSTRACT

A smartphone includes: a touch panel display that performs display and receives an operation by a user; flash memory; a CPU; and a time display program that is stored in the flash memory and is configured so as to be executed by the CPU. This time display program includes: a command for causing the touch panel display to receive a selection operation of a specified city by the user; and a command for causing the touch panel display to display a center of a local time display of the specified city so as to be superimposed on a display location of the specified city in a map showing the specified city.

18 Claims, 15 Drawing Sheets

(56) References Cited

U.S. PATENT DOCUMENTS

| | | | | |
|---|---|---|---|---|
| 6,278,660 B1* | 8/2001 | Tognazzini | .......... | G04G 9/0076 |
| | | | | 368/21 |
| 7,065,718 B2* | 6/2006 | Lection | ............... | G06F 3/04847 |
| | | | | 345/179 |
| 7,586,399 B2* | 9/2009 | Joo | ....................... | G04G 9/0076 |
| | | | | 340/309.16 |
| 8,280,413 B2* | 10/2012 | Choi | .................... | G04G 9/0076 |
| | | | | 455/457 |
| 2004/0027396 A1* | 2/2004 | Lection | ............... | G06F 3/04847 |
| | | | | 715/863 |
| 2006/0232388 A1* | 10/2006 | Joo | ....................... | G04G 9/0076 |
| | | | | 340/309.16 |
| 2008/0045173 A1* | 2/2008 | Park | ....................... | G06Q 10/00 |
| | | | | 455/187.1 |
| 2008/0188210 A1* | 8/2008 | Choi | .................... | G04G 9/0076 |
| | | | | 455/414.3 |
| 2009/0228793 A1 | 9/2009 | Noh et al. | | |
| 2016/0252885 A1* | 9/2016 | Maruyama | ........... | G04G 9/0076 |
| | | | | 368/21 |
| 2017/0186399 A1* | 6/2017 | Moritani | ................ | G04G 9/007 |
| 2017/0255169 A1* | 9/2017 | Lee | ........................ | G04G 21/08 |

FOREIGN PATENT DOCUMENTS

| | | |
|---|---|---|
| JP | 2009-229106 A | 10/2009 |
| JP | 2012-181076 A | 9/2012 |

* cited by examiner

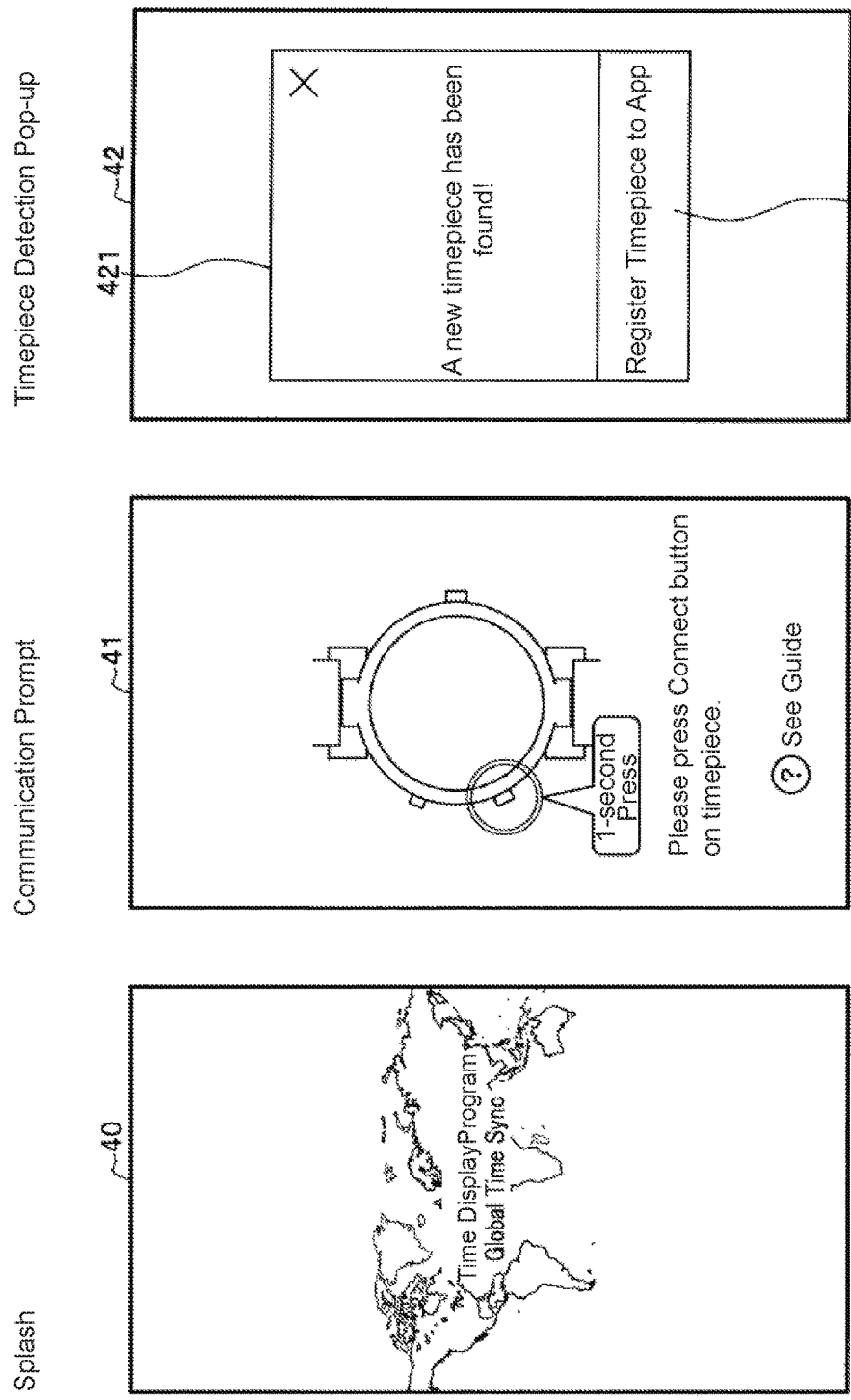

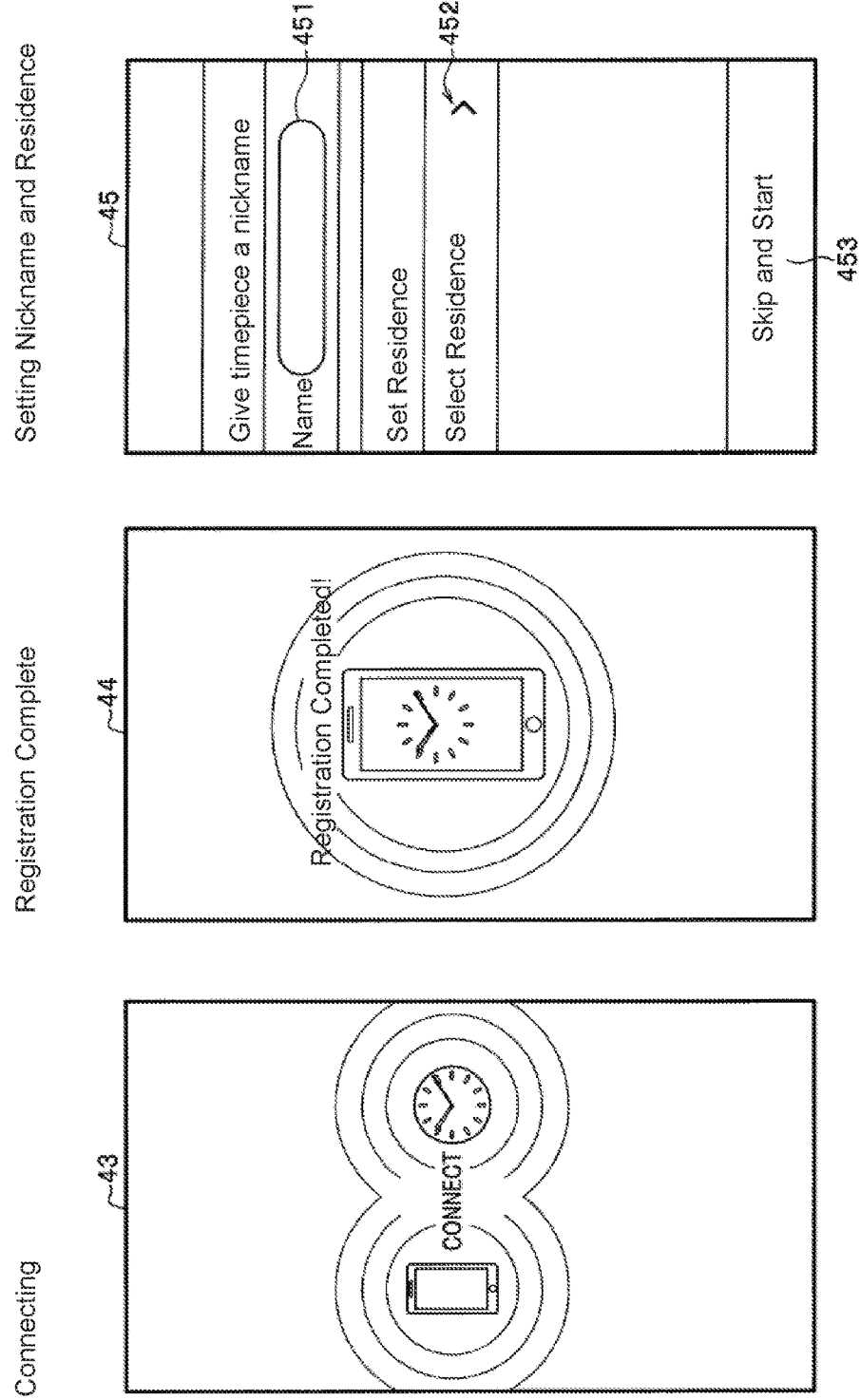

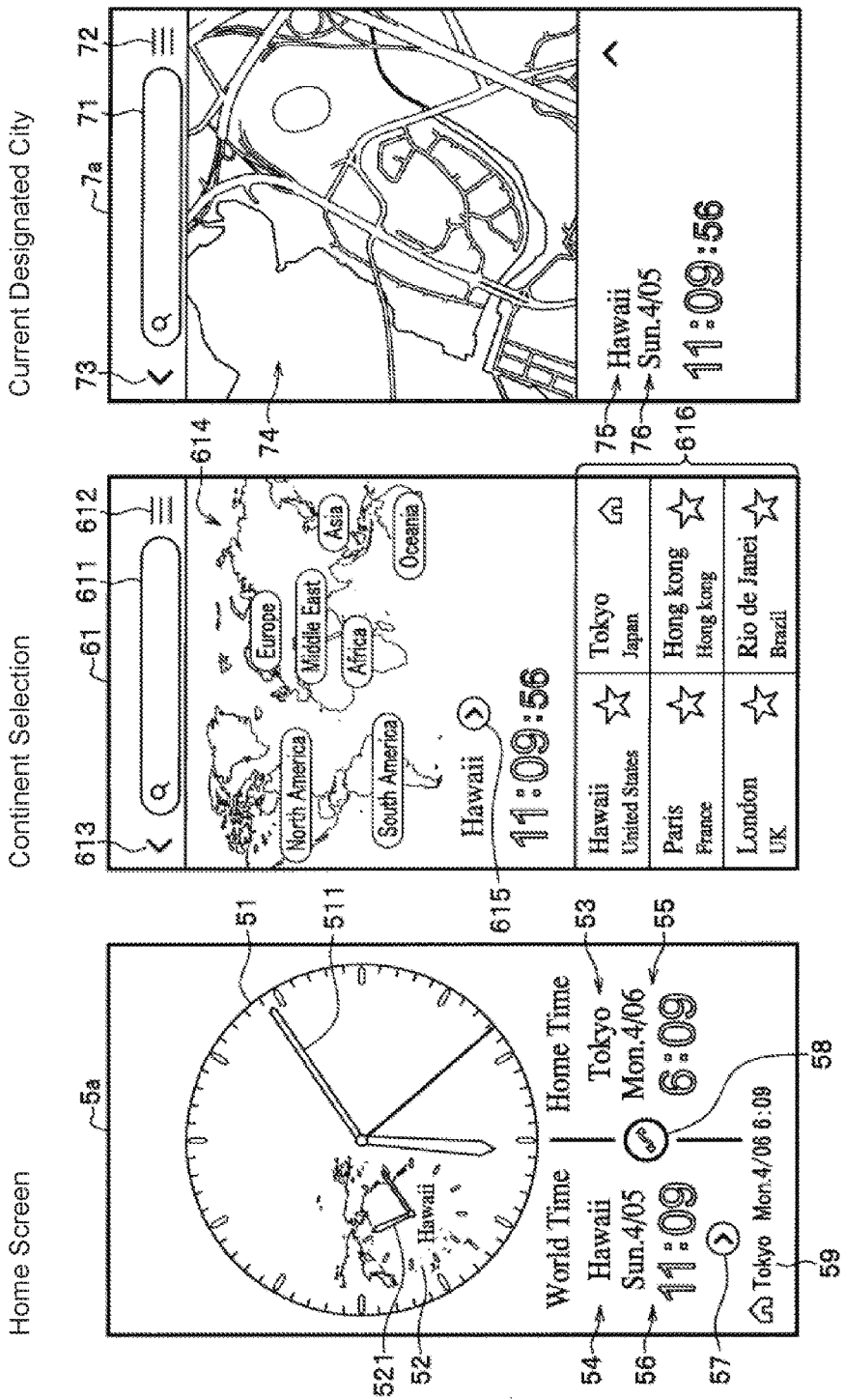

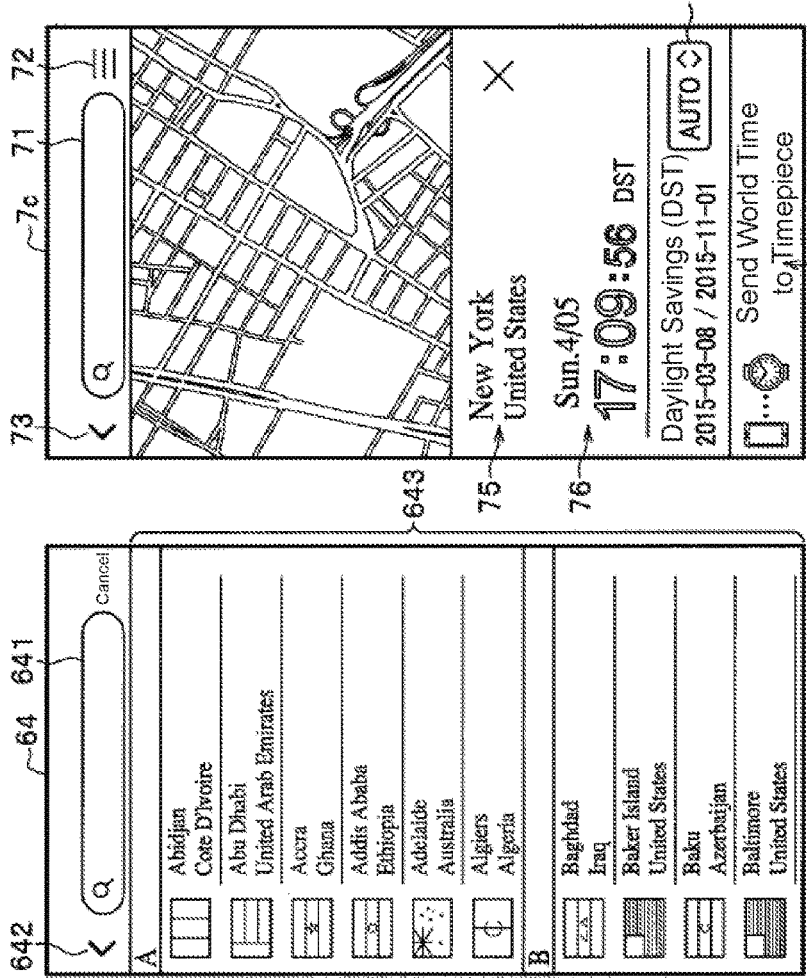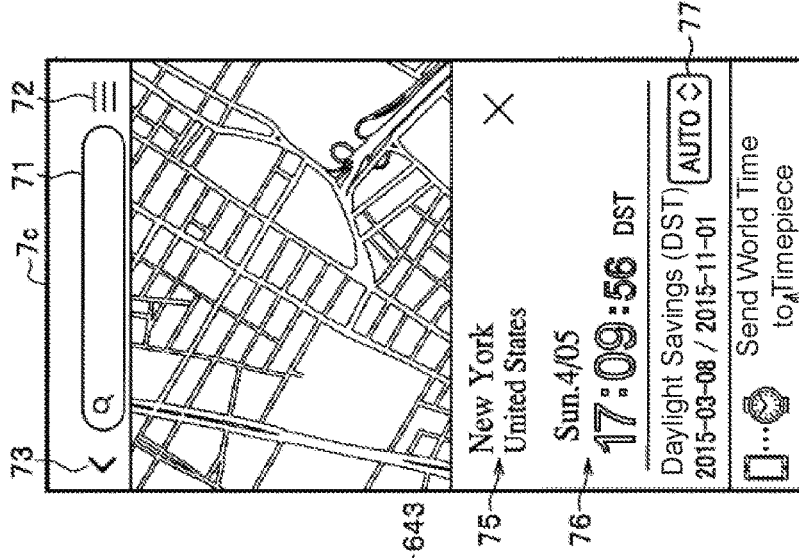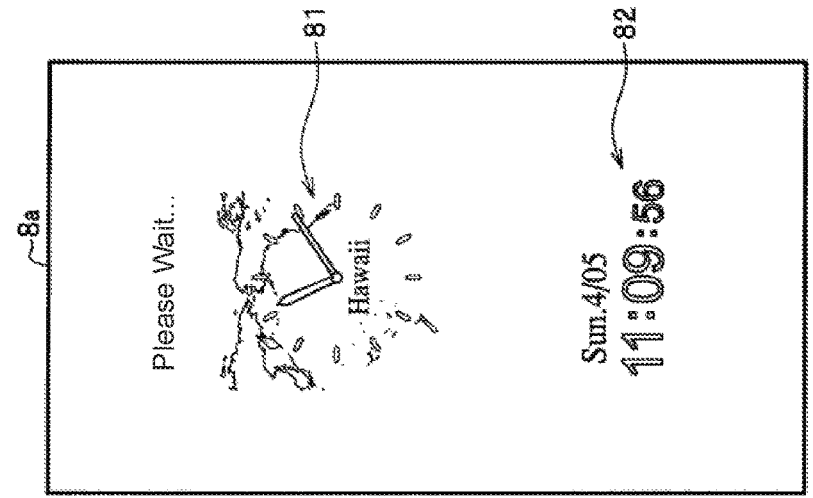

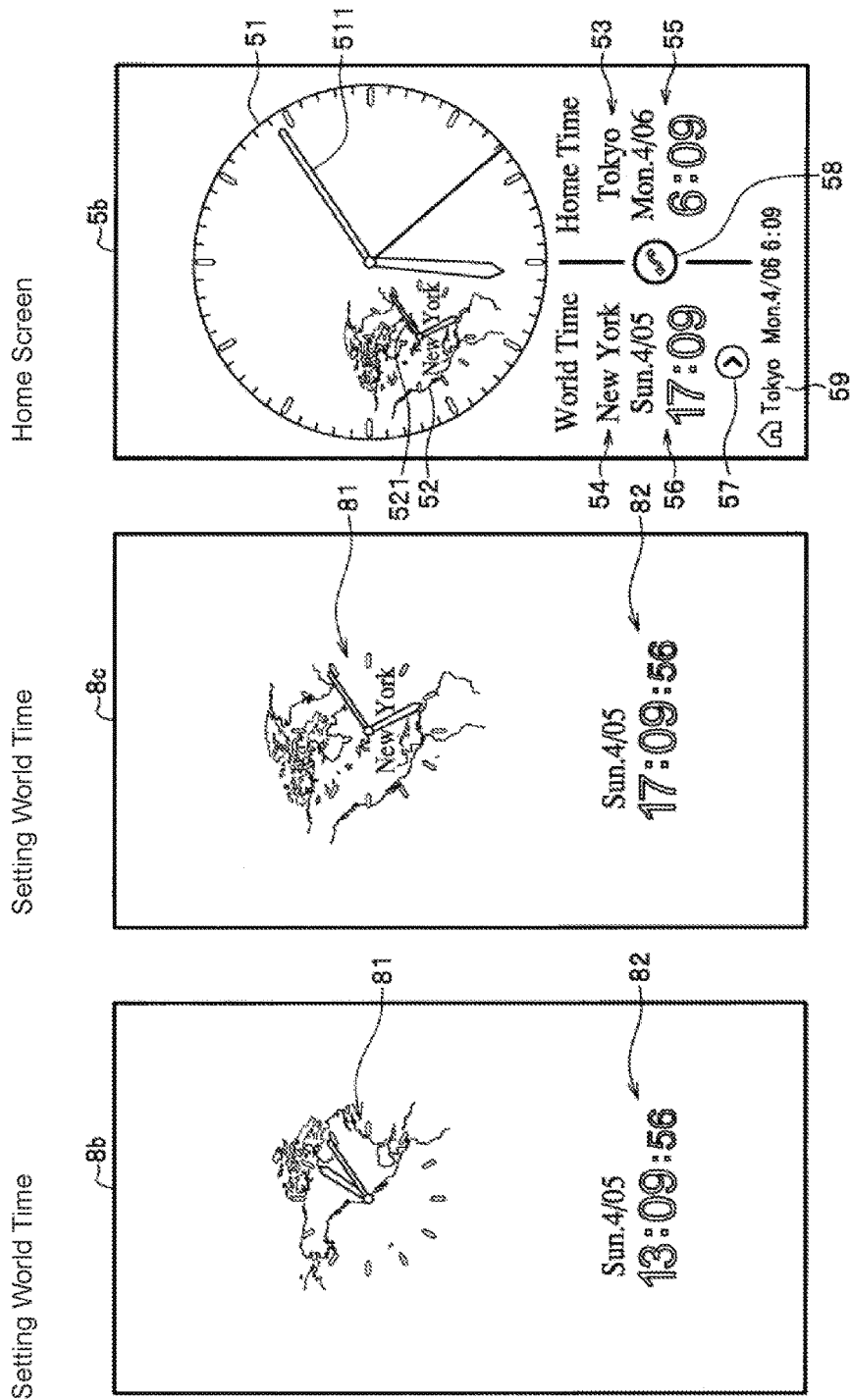

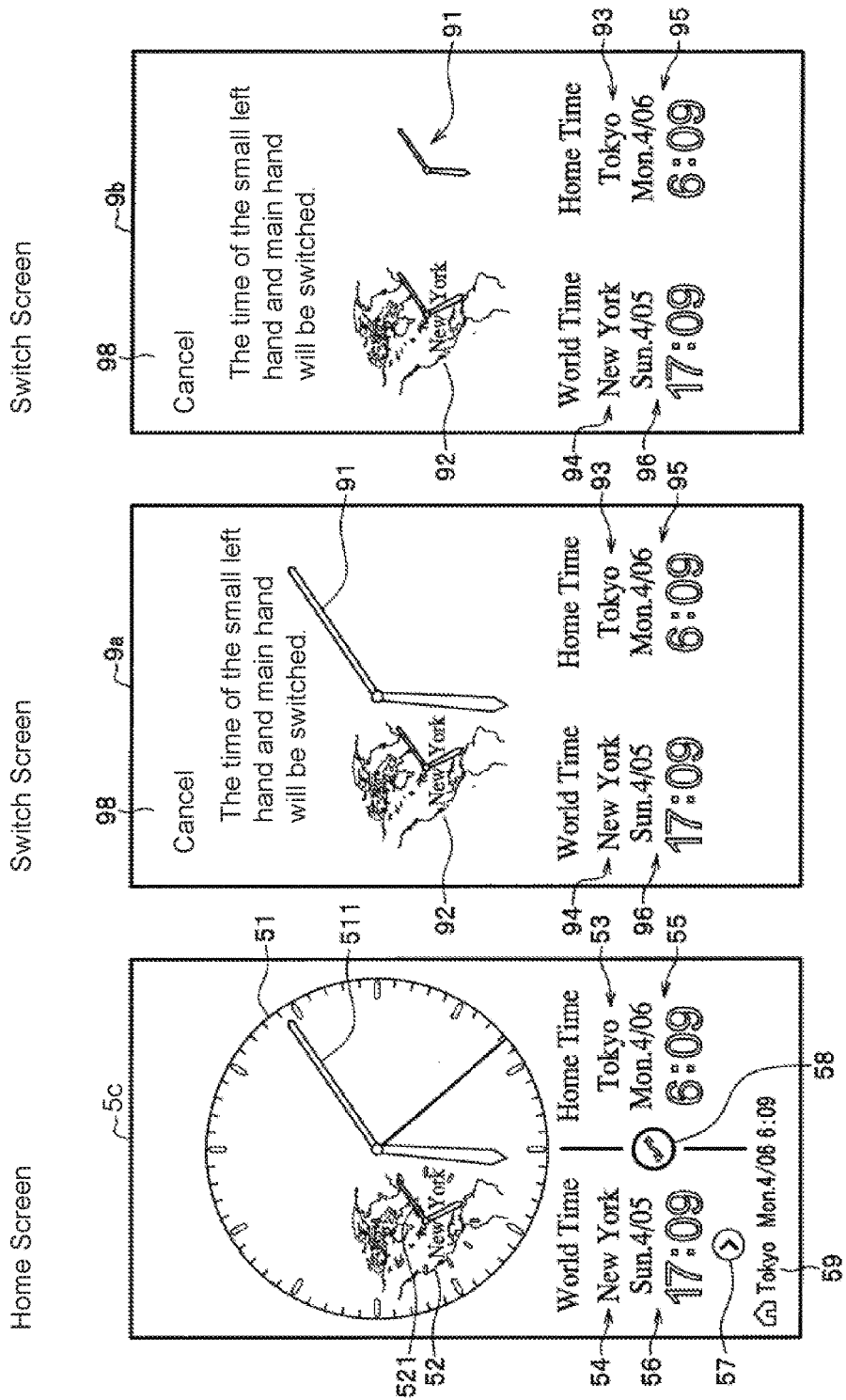

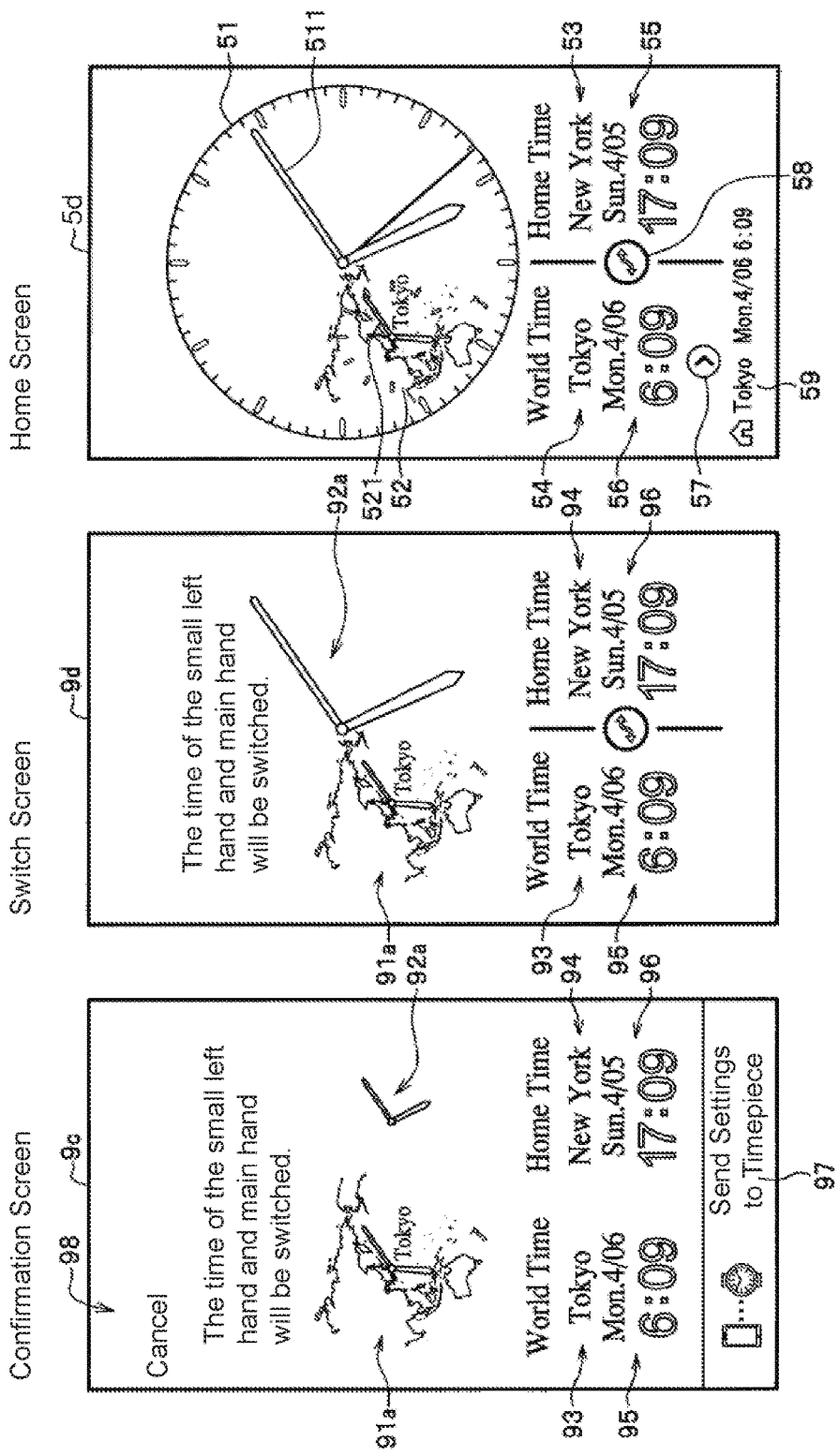

TIME DISPLAY DEVICE, TIME DISPLAY METHOD, AND RECORDING MEDIUM

BACKGROUND OF THE INVENTION

The present invention relates to a time display device, a time display method, and a recording medium.

Conventional analog timepieces include timepieces that include a main dial that displays the current time and a sub-dial that displays the local time in a specified city. The current time displayed on the main dial is the local time in the city in which the user of the timepiece is located, and is hereafter sometimes referred to as "Home Time." The local time displayed on the sub-dial is the local time in a city chosen by the user of the timepiece. This time is hereafter sometimes referred to as "World Time." In addition, "Home Time" is sometimes abbreviated as "HT" and "World Time" is sometimes abbreviated as "WT." The local times of the various cities reflect the Daylight Savings Time of those cities.

In the past, it was up to the user to remember which city had been set for World Time, which was associated with the sub-dial of the analog timepiece.

In recent years, as a result of the development of communication technology such as Bluetooth (registered trademark), it has become possible in smartphones to easily modify the settings of analog timepieces and synchronize these settings with the settings on the analog timepieces. By setting a World Time city associated with the sub-dial of the analog timepiece via a smartphone, it is possible for the user to later verify the city associated with World Time without having to rely on his or her own memory.

For example, in the display control means disclosed in Japanese Patent Application Laid-Open Publication No. 2009-229106, which is a Japanese patent document, a configuration is disclosed in which timepiece hands are moved to a positioning information display region, a time difference corresponding to stored positioning information is identified, and a time zone on a map corresponding to this time difference is indicated via the hands.

The time zones in the map of the invention disclosed in Japanese Patent Application Laid-Open Publication No. 2009-229106 are large regions that include a plurality of cities. Therefore, there is a possibility that it may be difficult for the user to verify if the time zone set in the sub-dial corresponds to the specified city.

SUMMARY OF THE INVENTION

The present invention is a time display device, a time display method, and a recording medium that make it easier to verify that the displayed local time and the specified city associated with the local time correspond. Accordingly, the present invention is directed to a scheme that substantially obviates one or more of the above-discussed and other problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a time display device, including: a display unit; an operation receiving unit that receives a selection operation indicating a selection of a city by a user; one or more processors connected to the display unit and the operation receiving unit; and one or more storage units storing a map image and instructions executed by the one or more processors; wherein the instructions include a segment that, in response to the selection operation by the user, causes the display unit to display the map image, a location in the map image of the city selected by the user, and a timepiece image that indicates a local time of the city such that a center of the timepiece image coincides with the location of the city in the map image.

In another aspect, the present disclosure provides a method of time display executed by a time display device that includes one or more processors, one or more storage units that store a map image and instructions executed by the one or more processors, a display unit, and an operation receiving unit, the method including: receiving a selection operation indicating a selection of a city by a user via the operation receiving unit; and displaying in the display unit the map image, a location of the selected city in the map image and a timepiece image that indicates a local time of the selected city such that a center of the timepiece image coincides with the location of the city.

In another aspect, the present disclosure provides a non-transitory storage medium having stored therein instructions that can be read by one or more processors in a time display device, the time display device further including a display unit and an operation receiving unit, wherein a map image is stored in the non-transitory storage medium or in a storage unit in the time display device, the instructions causing the one or more processors to perform the following: receiving a selection operation indicating a selection of a city by a user via the operation receiving unit; and displaying in the display unit the map image, a location of the selected city in the map image and a timepiece image that indicates a local time of the selected city such that a center of the timepiece image coincides with the location of the city.

In another aspect, the present disclosure provides a time display device, including: a display unit; an operation receiving unit that receives a selection operation indicating a selection of a city by a user; one or more processors; and one or more storage units storing a map image and instructions executed by one or more processors, wherein the one or more processors cause the display unit to display the map image, a location in the map image of the city selected via the operation receiving unit and a timepiece image that indicates a local time of the selected city such that a center of the timepiece image coincides with the location of the city in the map image.

It is to be understood that both the foregoing general description and the following detailed description are exemplary and explanatory, and are intended to provide further explanation of the invention as claimed.

BRIEF DESCRIPTION OF THE DRAWINGS

FIGS. 5A to 5C show (first) registration screens during the initial startup.

FIGS. 6A to 6C show (second) registration screens during the initial startup.

FIGS. 9A to 9C show (first) World Time setting screens.

FIGS. 11A to 11C show (third) World Time setting screens.

FIGS. 12A to 12C show (fourth) World Time setting screens.

FIGS. 14A to 14C show (first) Home Time/World Time switching screens.

FIGS. 15A to 15C show (second) Home Time/World Time switching screens.

DETAILED DESCRIPTION OF EMBODIMENTS

An embodiment of the present invention is described in detail below with reference to the various drawings.

Figure 1:
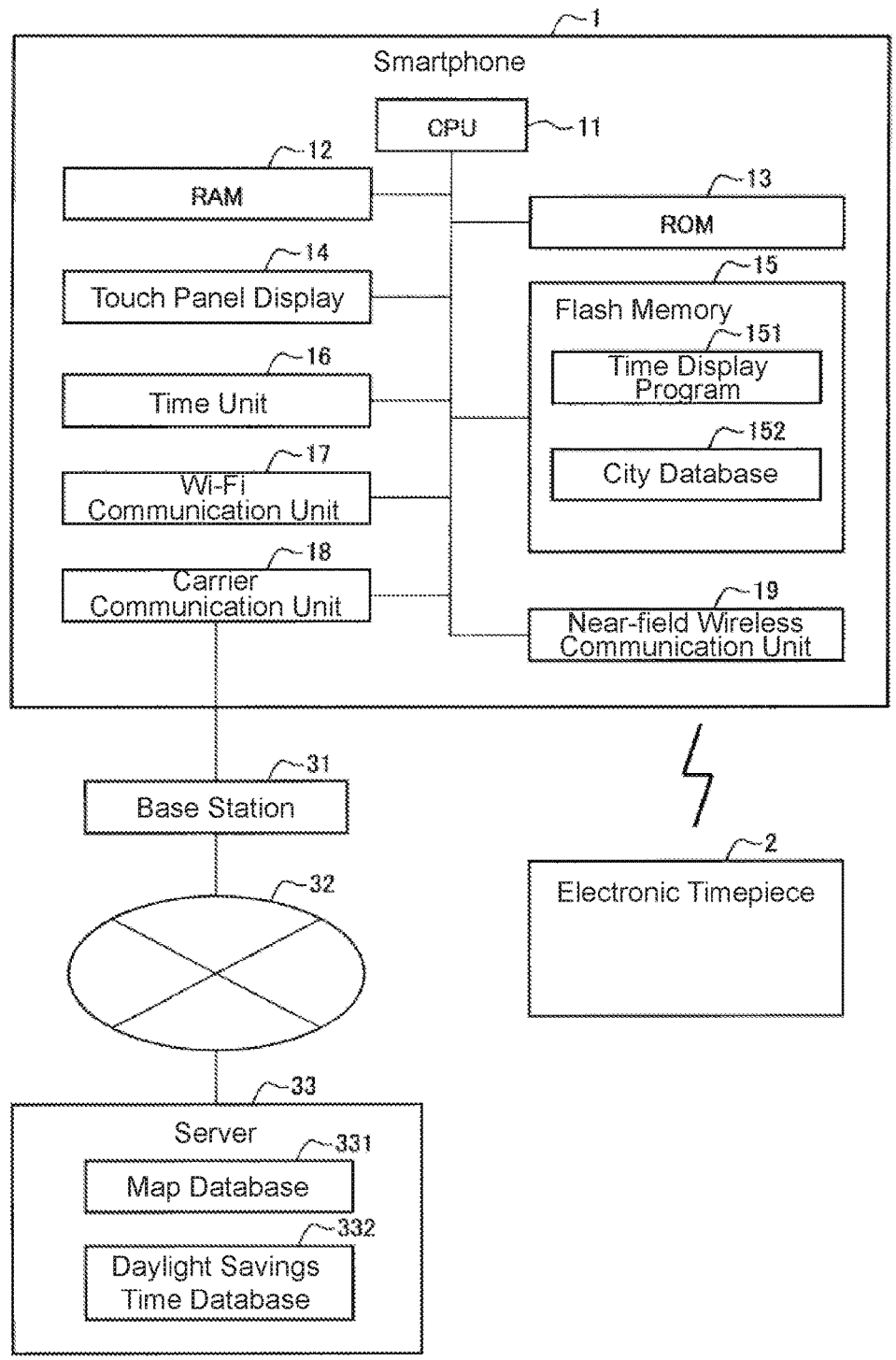
FIG. 1 is a configuration diagram that schematically shows the configuration of the system of the present embodiment.

FIG. 1 is a configuration diagram that schematically shows the system of the present embodiment.

In this system, a smartphone 1 and an electronic timepiece 2 are connected via near-field wireless communication so as to be able to communicate with each other. The smartphone 1 is connected to a server 33 via a base station 31 and a network 32. The smartphone 1 is able to refer to a Daylight Savings Time database 332 and a map database 331 housed within the server 33.

The map database 331 contains map information that shows things such as the main urban area of a city, for example. The Daylight Savings Time database 332 contains a combination of information regarding whether various cities observe Daylight Savings Time, how long Daylight Savings Time lasts, and the time adjustments for Daylight Savings Time.

The smartphone 1 is configured so as to include: a CPU (central processing unit) 11; RAM (random access memory) 12; ROM (read only memory) 13; a touch panel display 14; flash memory 15; a time unit 16; a Wi-Fi (registered trademark) communication unit 17; a carrier communication unit 18; and a near-field wireless communication unit 19.

The smartphone 1 (a time display device) is provided with: the touch panel display 14 (a display unit and an operation receiving unit), which displays information and receives operations by a user; storage units such as the RAM 12, ROM 13, and flash memory 15; the CPU 11, which is a processor; and a time display program 151 that is stored in the flash memory 15 and is configured so as to be executed by the CPU 11. The time display program 151 is one of the applications operated by the smartphone 1, and is configured so as to include various operational commands executed by the CPU 11.

The flash memory 15 stores a city database 152 that includes names and locations of various cities and time difference information relevant to Coordinated Universal Time.

The time unit 16 measures time. The Wi-Fi communication unit 17 performs wireless communication according to Wi-Fi standards, and the carrier communication unit 18 performs wireless communication via the base station 31 and the network 32. The near-field wireless communication unit 19 performs near-field wireless communication according to Bluetooth Low Energy standards, for example.

Figure 2:
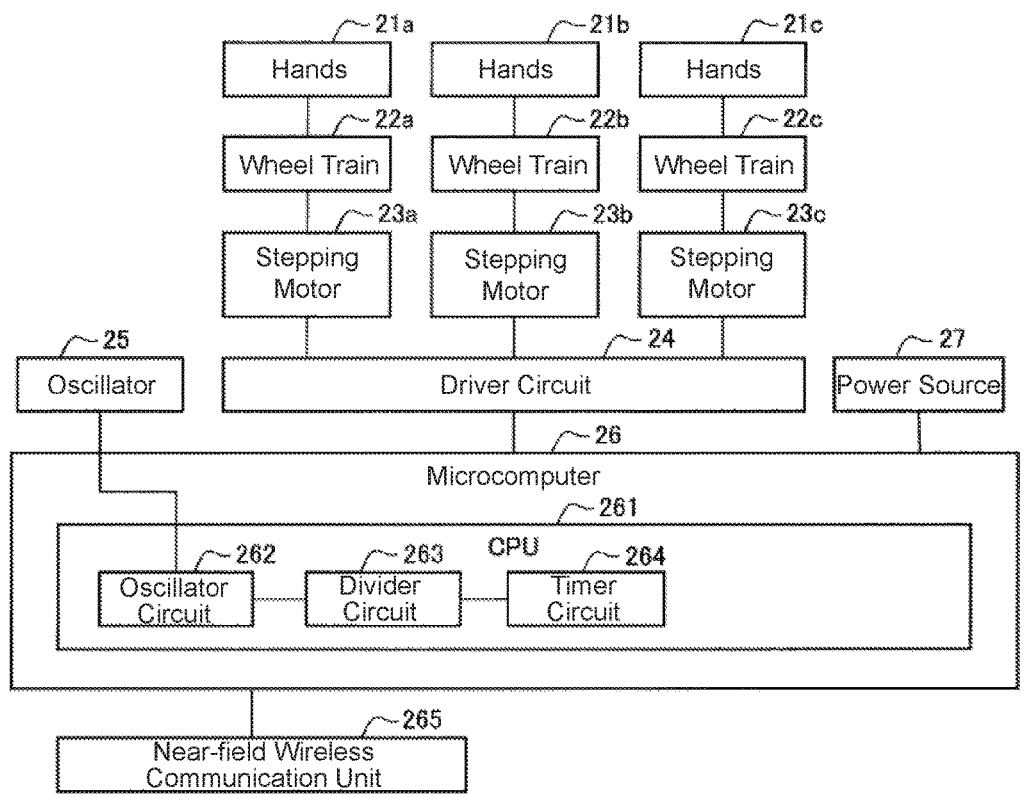
FIG. 2 is a block diagram that shows a configuration of an electronic timepiece.

FIG. 2 is a block diagram that shows the configuration of the electronic timepiece 2.

The electronic timepiece 2 of the present embodiment can respectively drive via independent motors: hands 21a that are the hour and minute hands of the main dial; a hand 21b that is the second hand; and hands 21c that are the hour and minute hands of the sub-dial. The electronic timepiece 2 may be an electronic wristwatch that includes a strap for securing the timepiece to a wrist, for example; there are no particular restrictions regarding the configuration of the timepiece 2, however. The electronic timepiece 2 includes, for example: the hands 21a; a stepper motor 23a that rotationally drives the hands 21a via a wheel train mechanism 22a; and a driver circuit 24. The hand 21b and the hands 21c also have a similar configuration.

The hands 21a, which are the hour and minute hands of the main dial, the hand 21b, which is the second hand, and the hands 21c, which are the hour and minute hands of the sub-dial, can be respectively rotated independent of one another. Hereafter, the hands 21a to 21c will be simply referred to as the hands 21 when not being specifically distinguished from one another. The wheel train mechanisms 22a to 22c will be simply referred to as the wheel train mechanisms 22 when not being specifically distinguished from one another. The various stepper motors 23a to 23c will be simply referred to as the stepper motors 23 when not being specifically distinguished from one another.

The electronic timepiece 2 further includes: a microcomputer 26 that includes a CPU 261; an oscillator 25; a power source unit 27; and a near-field wireless communication circuit 265. The CPU 261 is configured so as to include: an oscillator circuit 262; a frequency divider circuit 263; and a timer circuit 264.

The hands 21a and the hand 21b are provided in a rotatable manner with respect to a rotating shaft of the main dial. The hands 21c are provided in a rotatable manner with respect to a rotating shaft of the sub-dial. The wheel train mechanisms 22a to 22c cause the respective hands 21a to 21c to rotate.

The driver circuit 24, in accordance with a control signal input from the CPU 261, outputs at the appropriate time a driving voltage signal for driving the stepper motors 23a to 23c. The driver circuit 24, in accordance with a setting signal from the CPU 261, is able to perform output by adjusting the driving voltage and the driving voltage pulse width for the stepper motors 23. The driver circuit 24 of the present embodiment is able to output driving voltage signals in the forward rotation direction and the reverse rotation direction to the stepper motors 23.

The CPU 261 carries out various types of arithmetic processing and controls the overall operation of the electronic timepiece 2. The CPU 261 reads and carries out various control programs (not shown), and continuously causes the various units to perform operations associated with time display. The CPU 261 sets target locations to which the hands 21 will move, and is the control means that controls the driving of the stepper motors 23 via the driver circuit 24.

The oscillator 25 and the oscillator circuit 262 generate unique frequency signals and output these signals to the frequency divider circuit 263. A crystal oscillator circuit, for example, can be used as the oscillator 25.

The frequency divider circuit 263 divides the signals input from the oscillator circuit 262 into signals of various frequencies that are used by the CPU 261 and the timer circuit 264, and then outputs these divided signals.

The timer circuit 264 is a counter circuit that calculates the current time by counting the number of prescribed frequency signals input from the frequency divider circuit 263 and adding this number to the initial time. The current time calculated by the timer circuit 264 is read by the CPU 261 and used for time display. This time calculation may be controlled via software.

The power source unit 27 is configured so as to be able to cause the electronic timepiece 2 to continuously and stably operate over a long period of time. The power source unit 27 is a combination of a battery and a DC-DC converter, for example. As a result, the voltage output from the power source unit 27 during the operation of the device is maintained at a prescribed value.

The near-field wireless communication circuit 265, via Bluetooth Low Energy standard communication, for example, sends and receives time information to and from the near-field wireless communication unit 19 of the smartphone 1 and synchronizes with the time of the smartphone 1. As a result, the electronic timepiece 2 is able to correct both of the times associated with Home Time and World Time by connecting to the smartphone 1 at a preset time of day.

Figure 3A:
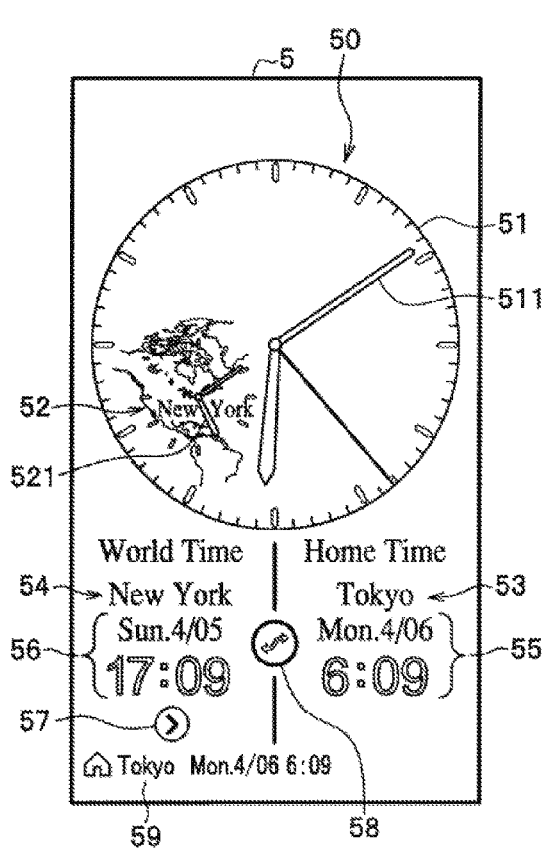
FIGS. 3A and 3B show the operation of a smartphone and the electronic timepiece.

FIG. 3A shows a home screen 5 that is displayed on the smartphone 1 after connecting to the electronic timepiece 2.

The home screen 5 is displayed on the touch panel display 14 as a result of the CPU 11 of the smartphone 1 carrying out the time display program 151. A virtual analog timepiece 50 is displayed on the home screen 5. The virtual analog timepiece 50 is configured so as to include: a main dial 51; and a sub-dial 52 displayed therein. The current time is displayed within the main dial 51 by hands 511. In this example, the local time in Tokyo is displayed as 6:09 by the hands 511.

The local time in a specified city is displayed as World Time in the sub-dial 52 via hands 521. In this example, the local time in New York is displayed as 17:09. As shown in this example, the time difference between Daylight Savings Time in New York and Japan time is −13 hours.

Furthermore, a central shaft of the local time display for New York is displayed in the sub-dial 52 so as to be superimposed on the display location of New York in the map showing New York. "New York," which is the name of the specified city, is displayed below this central shaft so as to be superimposed on the map. As a result, the smartphone 1 is able to make it easier to see that the local time in New York displayed on the sub-dial 52 corresponds to New York, the city associated with this local time.

The brightness of the map of New York in the sub-dial 52 is a brightness between the brightness of the background and the brightness of the hands 511 showing the local time. As a result, the user can clearly see the local time indicated by the hands 511. The color of "New York," which is the specified city name for the sub-dial 52, is a color that is different from the color of the hands 511 showing the local time. As a result, the user is able to clearly see the local time information and the specified city information associated with World Time, respectively.

A current city name 53, which is shown as "Tokyo," and a current time 55, which is shown as "Mon. 4/06 6:09," are displayed in the lower right of the virtual analog timepiece 50. A World Time city name 54, which is shown as "New York," and a World Time time 56, which is shown as "Sun. 4/05 17:09," are displayed in the lower left of the virtual analog timepiece 50.

A World Time setting button 57 for setting the city associated with World Time is displayed below the World Time time 56. The operations that occur when the World Time setting button 57 is tapped will be explained using FIGS. 8 to 12C, which will be mentioned later.

Place of residence information 59 is displayed below the World Time setting button 57. The place of residence information 59 includes: a home icon indicating place of residence; "Tokyo," which indicates the city name for the place of residence; and the local time for the place of residence.

A switch button 58 for switching the city settings for Home Time and World Time is displayed between the current time 55 and the World Time time 56. The operations that occur when the switch button 58 is tapped will be explained using FIGS. 13 to 15C, which will be mentioned later.

Figure 3B:
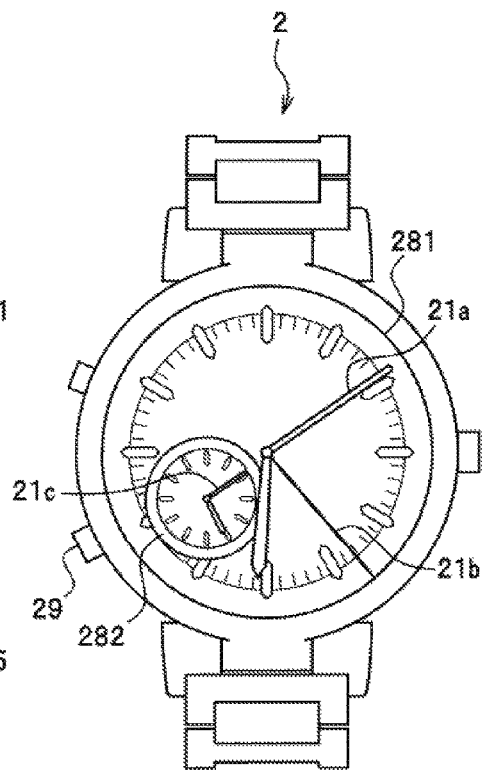

FIG. 3B shows the exterior of the electronic timepiece 2.

The electronic timepiece 2 includes: a main dial 281 that displays the current time; a sub-dial 282 that displays the local time in a specified city; and a connect button 29. The hands 21a that show the hour and minute of Home Time and the hand 21b that shows the second are rotatably provided on a central shaft of the main dial 281. The hands 21c that show the hour and minute of World Time are rotatably provided on a central shaft of the sub-dial 282.

The connect button 29 is a button for causing the electronic timepiece 2 to connect to the smartphone 1. The default settings and connecting of the electronic timepiece 2 and the smartphone 1 will be described using FIGS. 4 to 7C, which will be mentioned later.

As a result of the electronic timepiece 2 and the smartphone 1 being connected, the virtual analog timepiece 50 synchronizes the hands 21c showing World Time within the actual electronic timepiece 2 and the small hands 521 of the sub-dial 52 within the application. When the city that will be set for the small hands 521 of the sub-dial 52 within the application is selected, a world map is displayed such that the central shaft of the small hands 521 matches the location of the selected city. When the user modifies the city settings for World Time, the smartphone 1 moves the map displayed in the sub-dial 52.

In the present embodiment, the map image centered on the specified city selected by the user is configured to move such that the central shaft of the small hands 521 is superimposed on the location to be displayed. As a result, it is possible to determine at a glance the city to which the time displayed in the sub-dial 52 belongs, and the electronic timepiece 2 and the smartphone 1 become easier to use.

Figure 4:
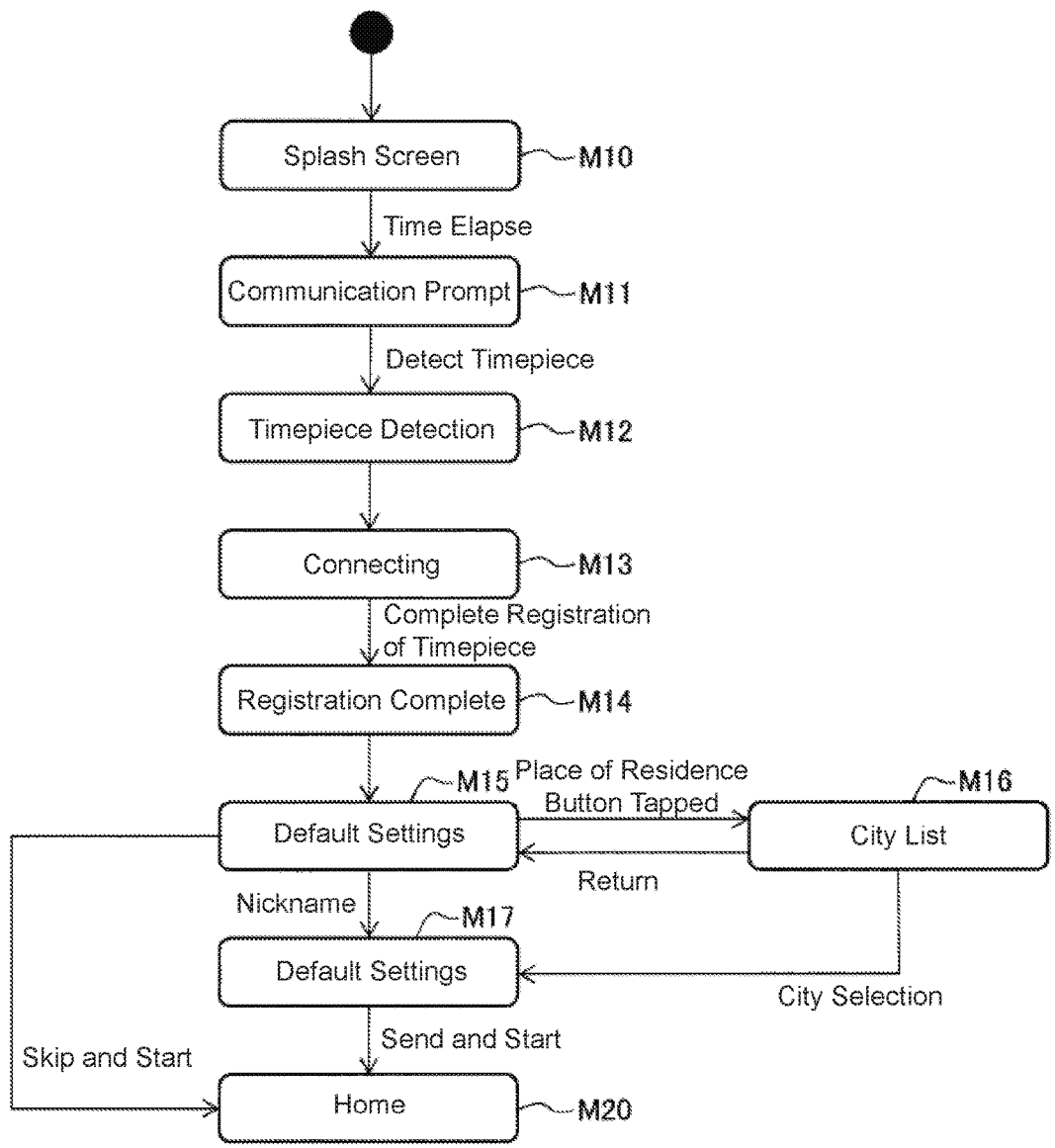
FIG. 4 is a mode transition diagram for the default settings.

FIG. 4 is a mode transition diagram for the default settings.

The process of setting the default settings involves the following: the smartphone 1 is turned on for the first time after the time display program 151 has been installed on the smartphone 1; the smartphone 1 displays a series of screens that prompt the setting of the default settings; and the smartphone 1 then transitions to the home screen 5 shown in FIG. 3A.

Once the time display program 151 is installed and the smartphone 1 is turned on, the smartphone 1 displays a splash screen on the touch panel display 14 (see FIG. 1; mode M10), and once a prescribed amount of time has elapsed, a communication prompting screen is displayed and a timepiece is detected (mode M11). When the smartphone 1 detects the timepiece (mode M12), a connecting screen is displayed (mode M13) and a registration completion screen is displayed once the timepiece has been registered (mode M14), after which a default settings screen is displayed (mode M15).

When "Skip and Start" is tapped on the default settings screen of mode M15, the smartphone 1 transitions to a home screen (mode M20). When the place of residence button is tapped on the default settings screen of mode M15, the smartphone 1 transitions to a city list screen (mode M16). When the back button is tapped on the city list screen, the smartphone 1 returns to the default settings screen (mode M15). When a city is chosen from the city list screen, the smartphone 1 transitions to a default settings screen of mode M17. In addition, when a nickname for the timepiece is input on the default settings screen of mode M15, the smartphone 1 transitions to the default settings screen of mode M17. When "Send and Start" is tapped on this default settings screen, the smartphone 1 transitions to the home screen (mode M20).

FIGS. 5A to 7C described below show respective registration screens that appear when the application is run for the first time.

FIG. 5A shows a splash screen 40.

The splash screen 40 is displayed on the touch panel display 14 (see FIG. 1) of the smartphone 1. The words "Timepiece Display Program" are displayed on the splash screen 40, and a world map is displayed in the background thereof. This splash screen 40 is displayed during the mode M10 shown in FIG. 4. Once a prescribed period of time has passed, the splash screen 40 transitions to a communication prompting screen 41 shown in FIG. 5B.

FIG. 5B shows the communication prompting screen 41.

The following are displayed on the communication prompting screen 41: an image showing the connect button 29 of the electronic timepiece 2; a bubble image containing the words "Press for 1 second," and text saying "Press the timepiece connect button." This communication prompting screen 41 is displayed during the mode M11 shown in FIG. 4. When the user follows the instructions on this communication prompting screen 41 and presses the connect button 29 of the electronic timepiece 2, the smartphone 1 transitions to a timepiece detection popup screen 42 shown in FIG. 5C.

FIG. 5C shows the timepiece detection popup screen 42.

A popup 421 and a registration button 422 are displayed on the timepiece detection popup screen 42. "A new timepiece has been found!" is displayed in the popup 421, and "Register the timepiece with this application" is displayed on the registration button 422. This timepiece detection popup screen 42 is displayed during the mode M12 shown in FIG. 4.

The smartphone 1 transitions to a connecting screen 43 shown in FIG. 6A as a result of the user tapping on the registration button 422.

FIG. 6A shows the connecting screen 43.

The word "CONNECT" and an image showing the smartphone 1 and the electronic timepiece 2 respectively generating radio waves is displayed on the connecting screen 43. This connecting screen 43 is displayed during the mode M13 shown in FIG. 4.

When the registration of the electronic timepiece 2 to the smartphone 1 is completed, the smartphone 1 transitions to a registration completion screen 44 shown in FIG. 6B.

FIG. 6B shows the registration completion screen 44.

The text "Registration complete!" and an image showing an analog timepiece being displayed on the smartphone 1 are displayed on the registration completion screen 44. This registration completion screen 44 is displayed during the mode M14 shown in FIG. 4.

When the registration completion screen 44 has been displayed for a prescribed period of time, the smartphone 1 transitions to a default settings screen 45 shown in FIG. 6C.

FIG. 6C shows the default settings screen 45.

The following is displayed on the default settings screen 45: a name text box 451 in which the nickname of the timepiece is input; a place of residence selection button 452 by which the place of residence of the user of the electronic timepiece 2 is selected; and a skip button 453 on which the text "Skip and Start" is displayed. The default settings screen 45 is displayed during the mode M15 shown in FIG. 4.

It is possible to distinguish between a plurality of similar timepieces as a result of the user inputting nicknames for the timepieces in the name text box 451. In addition, it is possible to prioritize and display the place of residence as one of the city options as a result of the user selecting the place of residence of the user of the electronic timepiece 2.

Figure 7A:
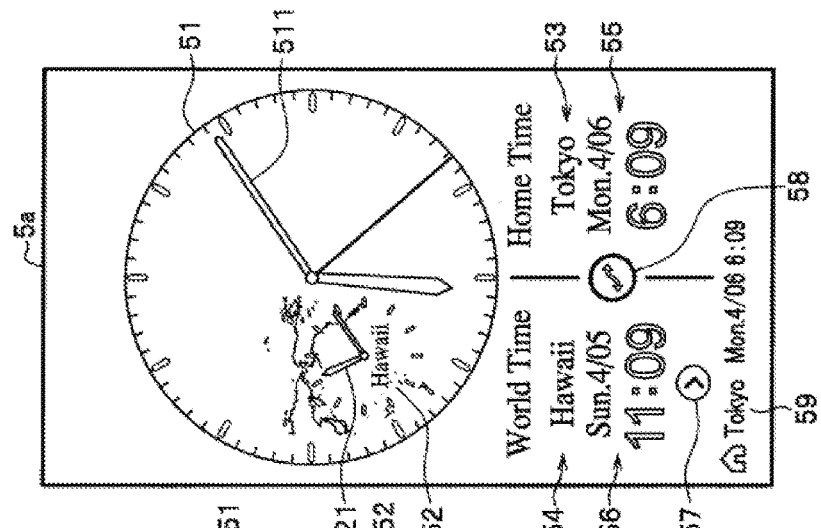
FIGS. 7A to 7C show (third) registration screens during the initial startup.
Figure 7B:
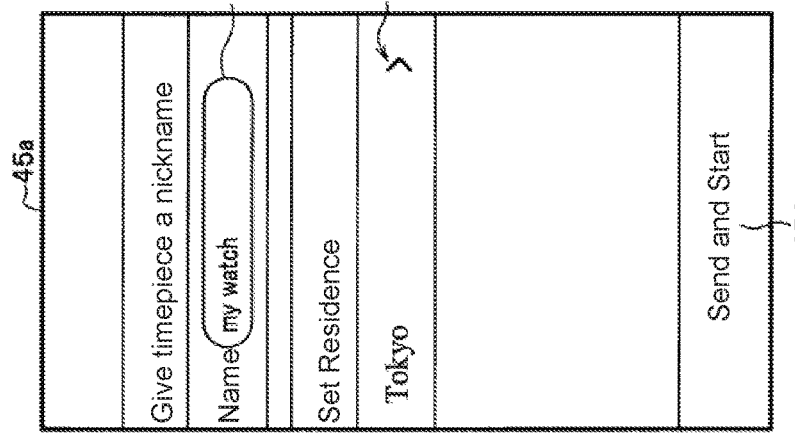
Figure 7C:
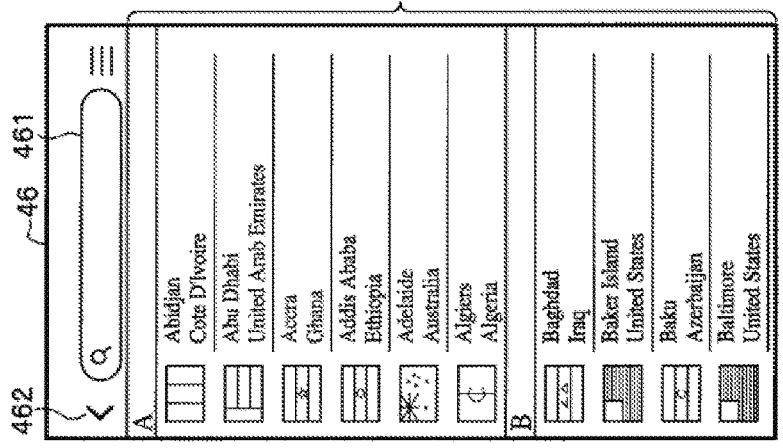

When the user sets the place of residence or performs input in the name text box 451 on the default settings screen 45, the smartphone 1 transitions to a default settings screen 45a that is shown in FIG. 7B. In addition, when the place of residence selection button 452 is tapped, the smartphone 1 transitions to a city list screen 46 that is shown in FIG. 7A. When the skip button 453 is tapped, the smartphone 1 transitions to the home screen 5a that is shown in FIG. 7C.

FIG. 7A shows the city list screen 46.

On the city list screen 46, a city list 463 is displayed in alphabetical order, and a city search text box 461 and a back button 462 are also displayed. The city list screen 46 is displayed during the mode M16 shown in FIG. 4. As a result, it is possible to easily input the place of residence of the user. Furthermore, it is possible to shorten the list of cities displayed in the city list 463 by inputting search keywords in the city search text box 461. For example, if the user inputs a "T," it is possible to easily select "Tokyo" since the list will be narrowed down to cities that begin with the letter "T."

When the user taps on one of the cities from the city list 463, the smartphone 1 transitions to the default settings screen 45a shown in FIG. 7B. When the user taps on the back button 462, the smartphone 1 transitions to the default settings screen 45 shown in FIG. 6C.

FIG. 7B shows the default settings screen 45a.

The following is displayed on the default settings screen 45a: the name text box 451 in which the nickname of the timepiece is input; the place of residence selection button 452 by which the place of residence of the user of the electronic timepiece 2 is selected; and a send button 454 on which the text "Send and Start" is displayed. This default settings screen 45a is displayed during the mode M17 shown in FIG. 4.

On this default settings screen 45a, the user has input "my watch" in the name text box 451, and has selected "Tokyo" as the place of residence.

When the user taps on the send button 454 on this default settings screen 45a, the smartphone 1 transitions to a home screen 5a shown in FIG. 7C.

FIG. 7C shows the home screen 5a.

This home screen 5a differs from the home screen 5 shown in FIG. 3A in that Hawaii has been selected as the city associated with World Time. The local time of the specified city is displayed as World Time in the sub-dial 52 via the hands 521. In this example, the local time in Hawaii is displayed as 11:09. Other than this one difference, the home screen 5a is identical to the home screen 5 shown in FIG. 3A. As shown in this example, the time difference between the local time in Hawaii and Japan time is −19 hours.

As a result of this mode transition through a series of default settings, the user is able to connect the electronic timepiece 2 and the smartphone 1, and is able to synchronize the time of the electronic timepiece 2 with the time of the smartphone 1. Since the time of the smartphone 1 is correctly synchronized via the mobile carrier network 32, it is possible to correctly synchronize the time of the electronic timepiece 2 that synchronizes with the smartphone 1.

The electronic timepiece 2 in which the default settings have been set connects to the smartphone 1 at a preset time of day, and both of the times associated with Home Time and World Time are adjusted. In other words, the smartphone 1 can send specified city information to the electronic timepiece 2 via the near-field wireless communication unit 19, and receive specified city information from the electronic timepiece 2 via the near-field wireless communication unit 19.

At the preset time of day, the smartphone 1 sends a data transmission request to the electronic timepiece 2. When the data transmission request is received, the electronic timepiece 2 responds and first sends city information and a Daylight Savings Time setting for Home Time, and then sends city information and a Daylight Savings Time setting for World Time.

Once the smartphone 1 has received these pieces of information, the smartphone 1, based on city information and local time information for the current location set in the operating system of the smartphone 1, responds and sends the following to the timepiece 2: a time difference corresponding to the city associated with Home Time, and the settings, rules, and time difference due to Daylight Savings Time. In this example, the local time is a time that reflects the Daylight Savings Time of the city that is the current location. The rules of Daylight Savings Time relate to the period of time for which Daylight Savings Time is observed. The settings for Daylight Savings Time are: AUTO/manual ON/manual OFF.

Specifically, when the Home Time city information that is received from the electronic timepiece 2 is different from the city information received the previous time, the smartphone 1 sends to the electronic timepiece 2: the Daylight Savings Time AUTO setting, and the time difference between the city information in the operating system of the smartphone 1 itself and the Home Time city information. Furthermore, if the Home Time city information received from the electronic timepiece 2 is identical to the city information received the previous time, the smartphone 1 sends back the Daylight Savings Time setting and the Home Time city information received from the electronic timepiece 2.

Next, the smartphone 1 sends to the electronic timepiece 2: the World Time city information and Daylight Savings Time setting received from the electronic timepiece 2, and a time difference between the city associated with World Time and the city in the operating system of the smartphone 1.

Suppose that the crown of the electronic timepiece 2 has been rotated to change the World Time time. As the World Time time changes, the CPU 261 of the electronic timepiece 2 erases the World Time city information and sets the Daylight Savings Time setting to "OFF." At such time, when the smartphone 1 synchronizes with the electronic timepiece 2, the World Time city name 54 for the virtual analog timepiece 50 of the smartphone 1 is erased and a map is no longer displayed in the background of the sub-dial 52. As a result, in the electronic timepiece 2, the smartphone 1 is able to clearly show that the World Time city information is now blank.

Figure 8:
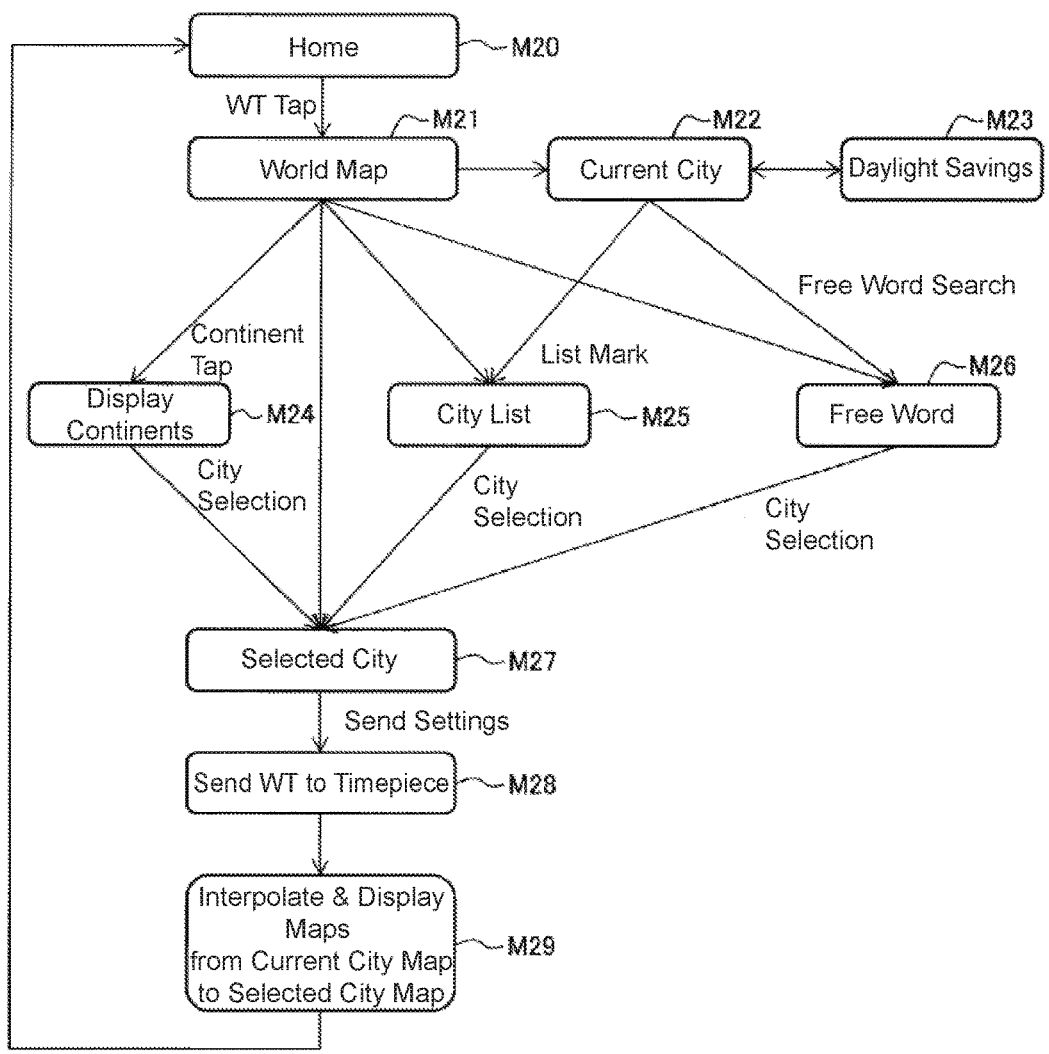
FIG. 8 is a mode transition diagram for when World Time is being set.

FIG. 8 is a mode transition diagram for when World Time is being set.

When the user taps on the World Time setting button 57 on the home screen of mode M20, the smartphone 1 transitions to a continent selection screen that shows a world map (mode M21). The concept of the user tapping on the World Time setting button 57 is abbreviated as "WT tap" in FIG. 8.

When the user selects the current city on the continent selection screen of mode M21, the smartphone 1 transitions to a current city screen (mode M22). Furthermore, the smartphone 1 can set the Daylight Savings Time setting (mode M23) for the electronic timepiece 2 from the current city screen.

When the user taps on any of the continents on the continent selection screen display of mode M21, the smartphone 1 transitions to a city selection screen (mode M24) that displays the continent. When the user selects a city on the city selection screen, the smartphone 1 transitions to a selected city screen (mode M27).

When the user taps on the list symbol on the continent selection screen (mode M21) or the current city screen (mode M22), the smartphone 1 transitions to a city list screen (mode M25). When the user selects a city on the city list screen, the smartphone 1 transitions to the selected city screen (mode M27).

When the user performs a search by inputting text on the continent selection screen (mode M21) or the current city screen (mode M22), the smartphone 1 transitions to a free word search screen (mode M26). When the user selects a city on the free word search screen, the smartphone 1 transitions to the selected city screen (mode M27).

When the user directs the smartphone 1 to send the settings on the selected city screen (mode M27), the smartphone 1 sends the World Time city information to the electronic timepiece 2 (mode M28), and sequentially interpolates and displays maps starting with the current city map and ending with the selected city map (mode M29), thereby causing the map displayed on the sub-dial to move. When the map has finished moving, the smartphone 1 once again returns to the home screen (mode M20) and displays the map of the selected city on the sub-dial.

FIGS. 9A to 12C described below respectively show screens associated with setting World Time.

FIG. 9A shows the home screen 5a.

This home screen 5a is identical to the home screen 5a shown in FIG. 7C. This home screen 5a is displayed during the mode M20 shown in FIG. 8. When the user taps on the World Time setting button 57 on this home screen 5a, the smartphone 1 transitions to a continent selection screen 61 shown in FIG. 9B.

FIG. 9B shows the continent selection screen 61.

The following are displayed on this continent selection screen 61: a city search text box 611; a list symbol 612; a back button 613; a world map 614; a designated city selection button 615; and a candidate city list 616. This continent selection screen 61 is displayed during the mode M21 shown in FIG. 8.

When the user taps on the designated city selection button 615, the smartphone 1 transitions to a city screen 7a that shows a map of the main part (Honolulu) of Hawaii, which is the current designated city. When the user taps on any one of the cities from the candidate city list 616, the smartphone 1 transitions to a city screen that shows an enlarged map of the selected city.

In this manner, the user is caused to first select a continent and then select a city located on the continent; thus, even if the user cannot clearly remember the name of the city that the user wishes to select, the user can still easily select the city if the user remembers the approximate location of the city on a world map.

Figures 10A, 10B, 10C:
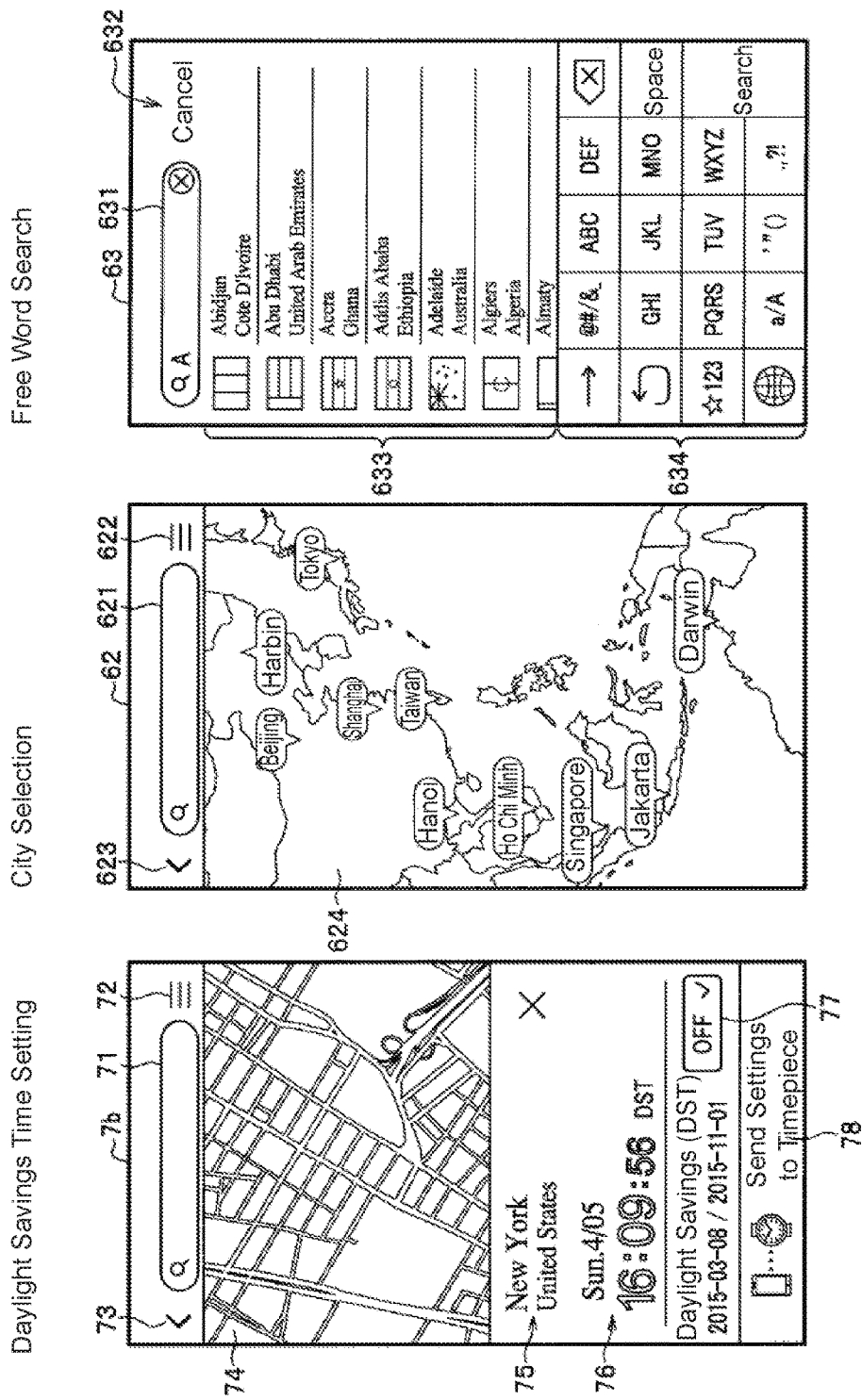
FIGS. 10A to 10C show (second) World Time setting screens.

When the user taps on the city search text box 611, the smartphone 1 transitions to a free word search screen 63 shown in FIG. 10C. When the user taps on the list symbol 612, the smartphone 1 transitions to a city list screen 64 shown in FIG. 11A. When the user taps on any one of the continents from the world map 614, the smartphone 1 transitions to a city selection screen 62 shown in FIG. 10B. When the user taps on the back button 613, the smartphone 1 returns to the home screen 5*a* shown in FIG. 9A.

FIG. 9C shows the city screen 7*a* that shows the main part (Honolulu) of Hawaii, which is the current designated city.

The following are displayed on the city screen 7*a*: a city search text box 71; a list symbol 72; and a back button 73 that are similar to those on the continent selection screen 61. In addition, a map 74 showing the main part (Honolulu) of Hawaii, a city name 75, which is shown as "Hawaii," and a local time 76 in Hawaii are also displayed. The smartphone 1 downloads a reference map for the operating system from the map database 331, and displays this map as the map 74. By using the reference map for the operating system of the smartphone 1 as the map 74, it is possible to decrease the file size of the time display program 151.

As of 2015, Hawaii does not observe Daylight Savings Time; thus, information related to Daylight Savings Time is not displayed on the city screen 7*a*. The city screen 7*a* is displayed during the mode M22 shown in FIG. 8.

FIG. 10A shows a city screen 7*b*, which shows the main part of New York, the designated city. This example shows a case in which a city for which Daylight Savings Time has been set is selected.

The following are displayed on the city screen 7*b*: the city search text box 71; the list symbol 72; and the back button 73, which are similar to those on the city screen 7*a* shown in FIG. 9C. In addition, the map 74, which shows the main part of New York, the city name 75, which is shown as "New York," the local time 76 in New York, an application button 77 for applying the various Daylight Savings Time options of AUTO/manual ON/manual OFF, and a setting transmission button 78 that sets the time settings in the electronic timepiece 2 are also displayed.

When the user taps on the application button 77, the button switches between the Daylight Savings Time settings of AUTO/manual ON/manual OFF in that order. The Daylight Savings Time setting of manual ON is a setting that applies Daylight Savings Time to the displayed time. The Daylight Savings Time setting of manual OFF is a setting that does not apply Daylight Savings Time to the displayed time. The Daylight Savings Time setting of AUTO is a setting that automatically applies Daylight Savings Time to the displayed time.

The rules for Daylight Savings Time are determined by each individual country, and are subject to change over time. Thus, the smartphone 1 refers to the external Daylight Savings Time database 332 and acquires the latest Daylight Savings Time rules for the various cities. As a result, even if the governments of the various countries change the rules for Daylight Savings Time, it is possible to cause the smartphone 1 and the electronic timepiece 2 to operate as usual in accordance with the latest Daylight Savings Time rules.

The city screen 7*b* shows that Daylight Savings Time in New York lasts from Mar. 8, 2015 to Nov. 1, 2015. The application button 77 shows "OFF," indicating that the manual OFF setting, in which Daylight Savings Time is not applied, will be sent to the electronic timepiece 2.

FIG. 10B shows the city selection screen 62.

The following are displayed on the city selection screen 62: a city search text box 621; a list symbol 622; and a back button 623 similar to those on the continent selection screen 61. In addition, a continent map 624 that shows the Eurasian continent is also displayed. The city selection screen 62 is displayed during the mode M24 shown in FIG. 8. On the continent map 624, the major cities of the Eurasian continent, such as Tokyo, Beijing, Harbin, and Shanghai, are shown inside bubbles. The user is able to select a desired city by tapping on one of the bubbles containing a city name.

When the user taps on the city search text box 621, the smartphone 1 transitions to the free word search screen 63 shown in FIG. 10C. When the user taps on the list symbol 622, the smartphone 1 transitions to the city list screen 64 shown in FIG. 11A. When the user taps on any one of the bubbles containing a city name on the continent map 624, the smartphone 1 transitions to a city screen 7*c* shown in FIG. 11B and displays the city information associated with the bubble. When the user taps on the back button 613, the smartphone 1 returns to the continent selection screen 61 shown in FIG. 9B.

FIG. 10C shows the free word search screen 63.

A city search text box 631 and a cancel button 632 are displayed on the free word search screen 63. In addition, a city list 633 and an input key area 634 are displayed below the text box 631 and the cancel button 632. The free word search screen 63 is displayed during the mode M26 shown in FIG. 8.

A list of cities in which the front portion matches the letter sequence input in the city search text box 631 is displayed in the city list 633. When the user taps on any one of the cities in the city list 633, that city is selected, and the smartphone 1 transitions to the city screen 7*c* shown in FIG. 11B. The input key area 634 is an area for displaying candidate input keys for the city search text box 631 and for prompting the user to tap the screen.

When the user taps on the city search text box 621, the smartphone 1 transitions to the free word search screen 63 shown in FIG. 10C. When the user taps on the list symbol 622, the smartphone 1 transitions to the city list screen 64 shown in FIG. 11A. When the user taps on any one of the bubbles containing a city name on the continent map 624, the smartphone 1 transitions to the city screen 7*c* shown in FIG. 11B and displays the city information associated with the bubble. When the user taps on the cancel button 632, the smartphone 1 returns to the previous screen that transitioned to the free word search screen 63.

FIG. 11A shows the city list screen 64.

On the city list screen 64, a city list 643 is displayed in alphabetical order, and a city search text box 641 and a cancel button 642 are also displayed. This city list screen 64 is displayed during the mode M25 shown in FIG. 8. As a result, it is possible to easily input the city associated with World Time. Furthermore, as a result of search keywords being input in the city search text box 641, the smartphone 1 transitions to the free word search screen 63 shown in FIG. 10C and it is thus possible to shorten the list of cities displayed in the city list 643.

When the user taps on any one of the cities in the city list 643, the smartphone 1 transitions to the city screen 7c shown in FIG. 11B. When the user taps on the cancel button 642, the smartphone 1 returns to the previous screen that transitioned to the city list screen 64.

FIG. 11B shows the city screen 7c associated with the selected city.

This city screen 7c differs from the city screen 7b shown in FIG. 10A in that the screen 7c includes a World Time setting button 79 instead of the setting button 78. This city screen 7c is displayed during the mode M27 shown in FIG. 8.

When the user taps on the World Time setting button 79, the screens shown in FIGS. 11C to 12B are sequentially displayed, after which, as shown in FIG. 12C, the display of the sub-dial 52 in the virtual analog timepiece 50 displayed on the home screen 5 changes. At the same time, the displayed time according to the hands 21c of the sub-dial 282 of the electronic timepiece 2 also changes.

FIG. 11C shows a World Time setting screen 8a.

In this World Time setting screen 8a, a World Time dial display 81 and the World Time time 82 are displayed. When the user initially taps on the World Time setting button 79, a map of Hawaii, the previous city, is displayed in the World Time dial display 81, and the local time for Hawaii is displayed as the World Time time 82. The World Time setting screen 8a is displayed during mode M29 shown in FIG. 8.

FIG. 12A shows a World Time setting screen 8b.

In this World Time setting screen 8b, a map that is of an area between Hawaii, the previous city, and New York and that shows a time zone with a time difference of +2 hours from Hawaii is displayed on the World Time dial display 81. Furthermore, the local time of this time zone is displayed as the World Time time 82. The World Time setting screen 8b is displayed during the mode M29 shown in FIG. 8. In this manner, the smartphone 1 interpolates and displays maps that show various time zones starting in Hawaii and moving towards New York. At the same time, the local times of the various time zones are also displayed. As a result, the user is able to clearly see how the World Time settings have been changed.

FIG. 12B shows a World Time setting screen 8c.

In this World Time setting screen 8c, a map of New York, the selected city, is displayed in the World Time dial display 81, and the local time in New York is displayed as the World Time time 82. This World Time setting screen 8c is displayed during the mode M29 shown in FIG. 8.

FIG. 12C shows a home screen 5b.

This home screen 5b differs from the home screen 5a shown in FIG. 9A in that New York has been selected as the World Time city. Otherwise, the home screen 5b is identical to the home screen 5a. This home screen 5b is displayed during the mode M20 shown in FIG. 8.

In the present embodiment, a map of the designated city is displayed in the sub-dial 52 of the virtual analog timepiece 50 in order to communicate the setting of World Time, which has become simpler through connecting to the smartphone 1, in a more understandable manner in the application. In the home screen 5a of FIG. 9A, a map centered on Hawaii is displayed in the sub-dial 52, and, in the home screen 5b of FIG. 12C, a map centered on New York is displayed in the sub-dial 52, for example. As a result, it is possible to easily verify that the local time displayed in the sub-dial 52 corresponds to New York, the city associated with this local time.

Furthermore, when switching from the home screen 5a to the home screen 5b, by moving and displaying the world map such that the central shaft of the hands 521 is located at the designated city, it is possibly to intuitively and clearly see the correspondence between the local time displayed by the hands 521 of the sub-dial 52 and the city associated with this local time.

Figure 13:
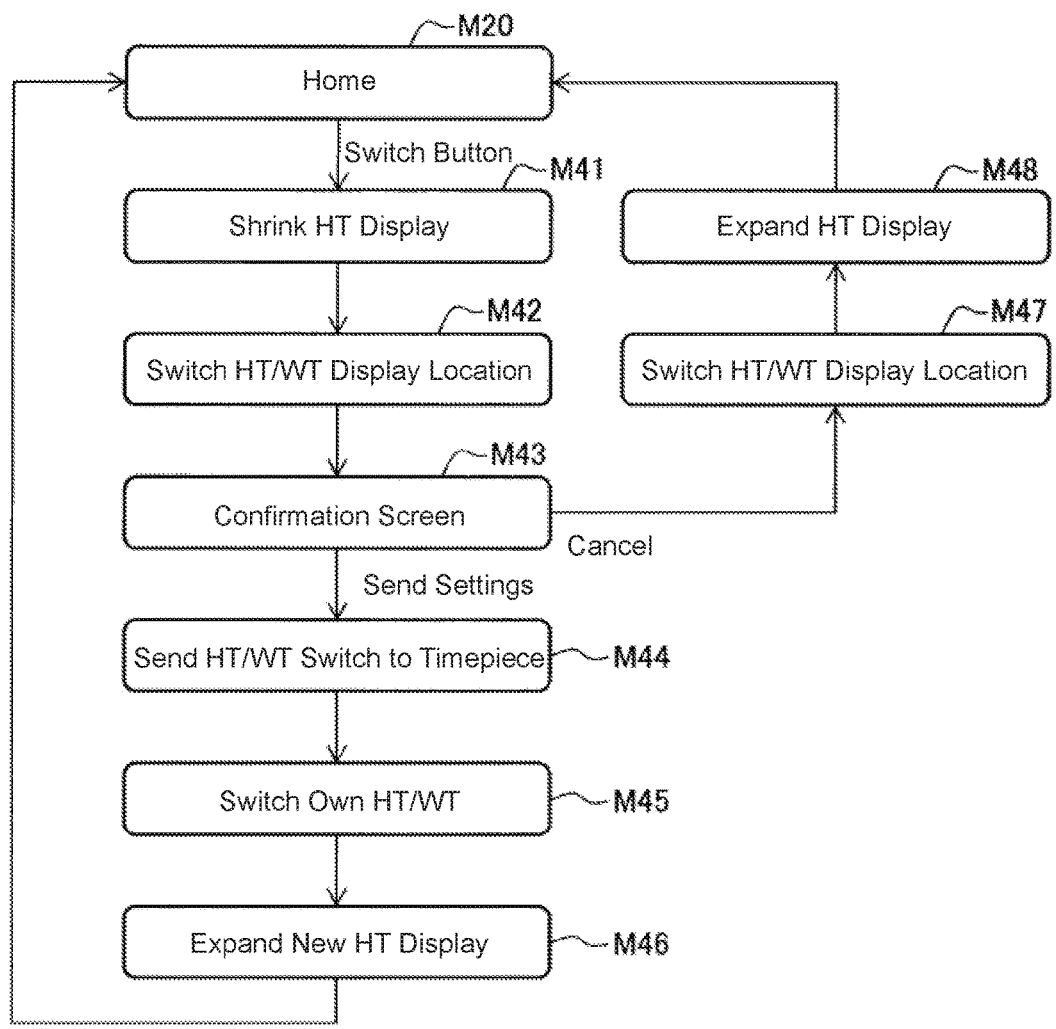
FIG. 13 is a mode transition diagram for switching Home Time and World Time.

FIG. 13 is a mode transition diagram for switching Home Time and World Time.

When the user taps on the switch button 58 on the home screen of mode M20, a switching operation of Home Time and World Time begins.

The smartphone 1 decreases the size of the Home Time display displayed on the touch panel display 14 (mode M41), and swaps the Home Time display location and the World Time display location in the left-right direction (mode M42).

The smartphone 1 displays a confirmation screen (mode M43) and waits for input.

If the user taps on the cancel button on the confirmation screen, the smartphone 1 swaps the Home Time display location and the World Time display location in the left-right direction (mode M47), enlarges the Home Time display displayed on the touch panel display 14 (mode M48), and returns to the home screen (mode M20).

If the user taps on the setting transmission button on the confirmation screen, the smartphone 1 sends the switching of Home Time and World Time to the electronic timepiece 2 (mode M44), switches the Home Time information and the World Time information on the virtual analog timepiece 50 (mode M45), then enlarges the new Home Time display (mode M46), and returns to the home screen.

FIGS. 14A to 15C respectively show screens associated with switching Home Time and World Time.

FIG. 14A shows the home screen 5c.

This home screen 5c is identical to the home screen 5b displayed in FIG. 12C, with the Home Time city being Tokyo, and the World Time city being New York. This home screen 5c is displayed during the mode M20 shown in FIG. 13. If the user taps on the switch button 58, the smartphone 1 sequentially transitions from a switching screen 9a in FIG. 14B to a confirmation screen 9c in FIG. 15A.

FIG. 14B shows the switching screen 9a.

This switching screen 9a displays main hands 91 that show the local time in Tokyo, and small hands 92 that are displayed on a map of New York and that show the local time in New York. This switching screen 9a is displayed during the mode M41 shown in FIG. 13. In this screen, the main hands 91 shrink while moving toward the right side of the screen.

A current city 93, which is shown as "Tokyo," and a current time 95 are displayed in the lower right of the switching screen 9a. A World Time city 94, which is shown as "New York," and a World Time time 96, which shows the local time in New York, are displayed in the lower left of the switching screen 9a.

FIG. 14C shows a switching screen 9b.

This switching screen 9b displays the main hands 91 that show the local time in Tokyo, and the small hands 92 that are displayed on a map of New York and that show the local time in New York. The main hands 91 are the same size as the small hands 92, and are located to the right of the small hands 92.

Thereafter, the main hands 91 and small hands 92, the current city 93 and World Time city 94, and the current time 95 and World Time time 96 are respectively sequentially displayed so as to swap locations in the left-right direction (mode M42), after which the smartphone 1 transitions to the confirmation screen 9c shown in FIG. 15A.

FIG. 15A shows the confirmation screen 9c.

Small hands 91a that are displayed on a map of Tokyo and that show the local time in Tokyo, and main hands 92a that show the local time in New York are displayed on this confirmation screen 9c. The main hands 92a are the same size as the small hands 91a, and are located to the right of the small hands 91a.

The World Time city 94, which is shown as "New York," and the World Time time 96, which shows the local time in New York, are displayed in the lower right of the confirmation screen 9c. The current city 93, which is shown as "Tokyo," and the current time 95 in Tokyo are displayed in the lower left of the confirmation screen 9c. In this manner, the smartphone 1 switches the Home Time city and the World Time city while displaying in advance a map of the city to which the user wants to switch as well as the name of the city. As a result, it is possible to prevent the user from erroneously switching to an undesired city.

A setting button 97 is displayed at the very bottom of the confirmation screen 9c. When the user taps on this setting button 97, the smartphone 1 instructs the electronic timepiece 2 to switch the Home Time city and the World Time city. As a result, the electronic timepiece 2 switches the respective display times by driving the hands 21a and the hands 21c. At the same time, the smartphone 1 transitions to the switching screen 9d in FIG. 15B and switches the Home Time city and the World Time city within the smartphone 1 itself.

A cancel button 98 is displayed at the top of the confirmation screen 9c. When the user taps on the cancel button 98, the smartphone 1 sequentially transitions to the switching screens 9b, 9a, and then returns to the home screen 5c shown in FIG. 14A.

FIG. 15B shows a switching screen 9d.

The small hands 91a, which show the local time in Tokyo, and the main hands 92a, which are displayed on a map of Tokyo and which show the local time in New York, are displayed on this switching screen 9d. The smartphone 1 sequentially enlarges and displays the main hands 92a, and then transitions to a home screen 5d shown in FIG. 15C.

FIG. 15C shows the home screen 5d.

This home screen 5d differs from the home screen 5c shown in FIG. 14A in that the Home Time city is now New York and the World Time city is now Tokyo. In other words, on the home screen 5c, the Home Time city has replaced the World Time city and the World Time city has replaced the Home Time city.

As a result of the world map being displayed such that the central shaft of the small hands 521 matches the location of the designated city, it can be intuitively and clearly seen that the time set for the small hands 521 of the sub-dial 52 is the local time for the designated city. Furthermore, during the process of switching Home Time and World Time, the World Time map is displayed so as to be superimposed on the World Time time display after switching has been completed; thus, it is possible for the user to intuitively understand which city is the designated city after switching has occurred, and it is possible to prevent an incorrect city from being set for World Time.

Modification Examples

The present invention is not limited to the embodiment described above, and modified embodiments, such as (a) through (f) described below, for example, are possible without departing from the scope of the present invention.

(a) The setting of the time of the electronic timepiece 2 is not limited to being done by a smartphone, and may be done using any terminal device, such as a tablet terminal, a personal computer, or the like.

(b) There may be a plurality of CPUs included in the smartphone 1, and this plurality of CPUs may be configured so as to carry out a plurality of programs.

(c) The time display program 151 may be stored in a type of memory other than flash memory.

(d) The present invention is not limited to a smartphone that displays a virtual analog timepiece and synchronizes with another timepiece. The present invention may also be the main body of a smart watch that is used by being attached to the wrist in a manner similar to a wristwatch, although the present invention is not limited to this, either.

(e) The communication between the smartphone 1 and the electronic timepiece 2 is not limited to Bluetooth Low Energy standards, and any communication standard may be used.

(f) Suppose that the World Time time has been changed by rotating the crown of the electronic timepiece 2 and the city information is blank. When the received city information is blank, the smartphone 1 may set, as a new specified city, a city that matches the received time difference and is closest to the previously set specified city. Alternatively, the smartphone 1 may set, as a new specified city, a city that matches the received time difference and that is connected by land to the previously set specified city. As a result, the smartphone 1 is able to display a map of a new city on the sub-dial of the virtual analog timepiece.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A time display device, comprising:
a display unit;
an operation receiving unit that receives a selection operation indicating a selection of a city by a user;
one or more processors connected to the display unit and the operation receiving unit; and
one or more storage units storing a map image and instructions executed by said one or more processors;
wherein said instructions include a segment that, in response to the selection operation by the user, causes the display unit to display said map image, a location in said map image of said city selected by the user, and a timepiece image that indicates a local time of said city such that a center of the timepiece image coincides with said location of said city in said map image.

2. The time display device according to claim 1, wherein said instructions further include a segment that, when the user selects another city as a replacement of said previously selected city via the operation receiving unit, updates said city and said local time of said city so that the display unit displays a location of said updated city now selected by the user, and a timepiece image that indicates said updated local time of said updated city such that a center of the timepiece image coincides with said location of said updated city.

3. The time display device according to claim 2, wherein said instructions further include a segment that causes the display unit to display a name of the selected city adjacent to the center of the timepiece image indicating the local time of the selected city that coincides with the location in the map image of the selected city.

4. The time display device according to claim 1, further comprising a communication unit that connects to an external network,
wherein said instructions further include a segment that, when the user selects another city as a replacement of said previously selected city via the operation receiving unit, updates said city and said local time of said city when the user selects another city as a replacement of said previously selected city via the operation receiving unit,
wherein said instructions further include a segment that causes the communication unit to receive a map image of a map in which said updated city is located as an updated map image when the map image stored in said one or more storage units does not include said updated city and stores said updated map image in said one or more storage units so that the display unit displays said updated map image, a location in said updated map image of said updated city now selected by the user, and the timepiece image that indicates said updated local time of said updated city such that a center of the timepiece image coincides with said location of said updated city in said updated map image.

5. The time display device according to claim 4, wherein said instructions further include a segment that causes the display unit to display a name of the selected city adjacent to the center of the timepiece image indicating the local time of the selected city that coincides with the location in the map image of the selected city.

6. The time display device according to claim 1,
wherein said instructions further include a segment that causes the display unit to display a hometown timepiece image that is larger than said timepiece image indicating the local time of said selected city, the hometown timepiece image indicating a time of a hometown that is user selectable;
wherein the operation receiving unit is configured to receive from the user a switching operation that switches displays of the hometown timepiece image and the timepiece image for said selected city on the display unit, and
wherein said instructions further include a segment that, in response to the switching operation received from the user, switches roles of the hometown and the selected city, thereby making the hometown as a newly selected city and said selected city as a newly specified hometown, and that causes the display unit to display the hometown timepiece image for the newly specified hometown, a map image in which the newly selected city is located, a location in said map image of said newly selected city, and a timepiece image that indicates a local time of said newly selected city such that a center of the timepiece image coincides with said location of said city in said map image.

7. The time display device according to claim 6, wherein said instructions further include a segment that causes the display unit to display a name of the selected city adjacent to the center of the timepiece image indicating the local time of the selected city that coincides with the location in the map image of the selected city.

8. The time display device according to claim 1, further comprising a near field wireless communication unit that communicates with a timepiece,
wherein said instructions further include a segment that causes setting information regarding the city selected via the operation receiving unit to be transmitted to said timepiece via the near field wireless communication unit.

9. The time display device according to claim 8, wherein said instructions further include a segment that, when the near field wireless communication unit receives from the timepiece a notification that said setting information of the city have been deleted via the timepiece, causes the display unit to terminate a display of the map image for said selected city.

10. The time display device according to claim 9, wherein said instructions further include a segment that causes the display unit to display a name of the selected city adjacent to the center of the timepiece image indicating the local time of the selected city that coincides with the location in the map image of the selected city.

11. The time display device according to claim 8, wherein said instructions further include a segment that, when the near field wireless communication unit receives from the timepiece a notification that said setting information of the selected city have been deleted via the timepiece as a result of a user of the timepiece changing setting of said local time, and receives, from the timepiece, information indicating time difference between said changed local time and the previously set local time, causes the one or more processors to determine a city that is within a prescribed range of said time difference and that is located closest to the previously selected city as a newly selected city for which the local time and the location thereof is displayed in the map image.

12. The time display device according to claim 11, wherein said instructions further include a segment that causes the display unit to display a name of the selected city adjacent to the center of the timepiece image indicating the local time of the selected city that coincides with the location in the map image of the selected city.

13. The time display device according to claim 8, wherein said instructions further include a segment that causes the display unit to display a name of the selected city adjacent to the center of the timepiece image indicating the local time of the selected city that coincides with the location in the map image of the selected city.

14. The time display device according to claim 1, wherein said instructions further include a segment that causes the display unit to display a name of the selected city adjacent to the center of the timepiece image indicating the local time of the selected city that coincides with the location in the map image of the selected city.

15. The time display device according to claim 1, wherein the display unit and the operation receiving unit is comprised of a touch panel.

16. A method of time display executed by a time display device that includes one or more processors, one or more storage units that store a map image and instructions executed by said one or more processors, a display unit, and an operation receiving unit, the method comprising:
receiving a selection operation indicating a selection of a city by a user via said operation receiving unit; and
displaying in the display unit said map image, a location of said selected city in said map image and a timepiece image that indicates a local time of said selected city such that a center of the timepiece image coincides with the location of said city.

17. A non-transitory storage medium having stored therein instructions that can be read by one or more processors in a time display device, the time display device further including a display unit and an operation receiving unit, wherein a map image is stored in the non-transitory storage medium or in a storage unit in the time display device, said instructions causing said one or more processors to perform the following:

receiving a selection operation indicating a selection of a city by a user via said operation receiving unit; and displaying in the display unit said map image, a location of said selected city in said map image and a timepiece image that indicates a local time of said selected city such that a center of the timepiece image coincides with the location of said city.

18. A time display device, comprising:

a display unit;

an operation receiving unit that receives a selection operation indicating a selection of a city by a user;

one or more processors; and one or more storage units storing a map image and instructions executed by one or more processors, wherein said one or more processors cause the display unit to display said map image, a location in the map image of the city selected via the operation receiving unit and a timepiece image that indicates a local time of said selected city such that a center of the timepiece image coincides with said location of said city in said map image.

* * * * *